United States Patent
Norieda et al.

(10) Patent No.: US 12,505,697 B2
(45) Date of Patent: Dec. 23, 2025

(54) ANALYSIS APPARATUS, ANALYSIS METHOD, AND NON-TRANSITORY COMPUTER READABLE MEDIUM STORING PROGRAM

(71) Applicant: NEC Corporation, Tokyo (JP)

(72) Inventors: Shin Norieda, Tokyo (JP); Yoshiyuki Tanaka, Tokyo (JP); Shogo Akasaki, Tokyo (JP); Haruki Yokota, Tokyo (JP); Masami Sakaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 342 days.

(21) Appl. No.: 18/030,692

(22) PCT Filed: Oct. 12, 2020

(86) PCT No.: PCT/JP2020/038513
§ 371 (c)(1),
(2) Date: Apr. 6, 2023

(87) PCT Pub. No.: WO2022/079768
PCT Pub. Date: Apr. 21, 2022

(65) Prior Publication Data
US 2023/0377369 A1     Nov. 23, 2023

(51) Int. Cl.
*G06V 40/16* (2022.01)
*G06T 7/11* (2017.01)

(52) U.S. Cl.
CPC .............. *G06V 40/174* (2022.01); *G06T 7/11* (2017.01); *G06V 40/172* (2022.01); *G06T 2207/30201* (2013.01)

(58) Field of Classification Search
CPC ...... G06V 40/174; G06V 40/172; G06T 7/11; G06T 2207/30201; H04N 21/21; H04N 21/24; H04N 21/258; H04N 21/83
See application file for complete search history.

(56) References Cited

U.S. PATENT DOCUMENTS

| 9,646,198 B2 * | 5/2017 | Cunico | H04N 7/147 |
| 11,115,359 B2 * | 9/2021 | Song | H04L 51/42 |

(Continued)

FOREIGN PATENT DOCUMENTS

| JP | 2005-277462 A | 10/2005 |
| JP | 2014-511620 A | 5/2014 |

(Continued)

OTHER PUBLICATIONS

International Search Report for PCT Application No. PCT/JP2020/038513, mailed on Dec. 8, 2020.

*Primary Examiner* — John B Strege
(74) *Attorney, Agent, or Firm* — Sughrue Mion, PLLC

(57) ABSTRACT

An analysis apparatus comprises at least one memory storing instructions, and at least one processor configured to execute the instructions to comprises at least one memory storing instructions, and at least one processor configured to execute the instructions to acquire emotion data from an emotion data generation apparatus that generates emotion data from face image data of a meeting participant in an online meeting, generate analysis data for the meeting on the basis of the emotion data, acquire meeting data including attribute data of the meeting, store message data in which a pattern of a message to be presented to a user is associated with the meeting data, select the message on the basis of the analysis data and the message data, and store an analysis result including the selected message in a storage unit in an outputtable manner.

19 Claims, 10 Drawing Sheets

(56) References Cited

U.S. PATENT DOCUMENTS

| | | | | |
|---|---|---|---|---|
| 2005/0209848 | A1* | 9/2005 | Ishii | H04M 3/42221 |
| | | | | 704/231 |
| 2012/0222058 | A1* | 8/2012 | el Kaliouby | H04N 21/251 |
| | | | | 725/10 |
| 2020/0099890 | A1* | 3/2020 | Tanaka | H04N 7/147 |
| 2021/0021439 | A1* | 1/2021 | Gorny | H04L 12/1822 |
| 2021/0306173 | A1* | 9/2021 | Krikunov | G06F 3/015 |

FOREIGN PATENT DOCUMENTS

| | | |
|---|---|---|
| JP | 2019-061594 A | 4/2019 |
| JP | 2020-005030 A | 1/2020 |
| JP | 2020-048149 A | 3/2020 |

\* cited by examiner

MESSAGE DATA 121

| MEETING TYPE | ANALYSIS ITEM | SCORE | MESSAGE |
|---|---|---|---|
| SEMINAR | LEVEL OF ATTENTION | 50-100 | ATTENTION HAS BEEN PAID |
| | | 0-49 | LET'S ATTRACT ATTENTION |
| | LEVEL OF EMPATHY OF PRESENTER | 0-40 | LET'S INCREASE SMILE OF PRESENTER |
| | LEVEL OF EMPATHY OF NON-PRESENTER | 0-30 | LET'S INCREASE SMILE OF OBSERVER |
| | LEVEL OF EMPATHY | 0-40 | LEVEL OF EMPATHY SEEMS TO BE LOW |
| PROBLEM COUNTERMEASURE MEETING | LEVEL OF UNDERSTANDING | 36-60 | LET'S CHECK LEVEL OF UNDERSTANDING OF PARTICIPANT |
| ... | ... | ... | ... |

Fig. 9

ANALYSIS APPARATUS, ANALYSIS METHOD, AND NON-TRANSITORY COMPUTER READABLE MEDIUM STORING PROGRAM

This application is a National Stage Entry of PCT/JP2020/038513 filed on Oct. 12, 2020, the contents of all of which are incorporated herein by reference, in their entirety.

TECHNICAL FIELD

The present invention relates to an analysis apparatus, an analysis system, an analysis method, and a program.

BACKGROUND ART

In an online video meeting (hereinafter referred to as an online meeting), a technology for evaluating a situation and contents of a meeting has been proposed.

For example, a system described in Patent Literature 1 includes an image recognition unit that recognizes an image regarding each attendee, a voice recognition unit that identifies a speaker of each piece of speech in voice data, and a timeline management unit that outputs the voice data of each attendee as a timeline in time series of the speech. Furthermore, this system detects, for example, a transition from a state in which the tempo of speech by each of the attendees decreases to a state in which the tempo increases during the meeting, or a transition from a poor state to a good state of the meeting. Then, a plurality of attendees who have uttered speech during the transition are identified, keywords respectively included in the contents of the speech of the identified respective attendees are weighted on the basis of a predetermined condition, and scoring is performed for each of the attendees, thereby obtaining a degree of contribution of each of the attendees.

In addition, a meeting support system described in Patent Literature 2 includes an emotion discrimination unit that discriminates an emotion for each attendee on the basis of received video data, and a text data generation unit that generates speech text data indicating contents of speech of an attendee on the basis of received voice data. Further, the meeting support system includes a meeting minutes generation unit that generates meeting minutes data in which contents of speech of the attendees and emotions of the respective attendees at the time of the speech are recorded on the basis of the emotion data and the speech text data indicating a discrimination result from the emotion discrimination unit.

CITATION LIST

Patent Literature

Patent Literature 1: Japanese Unexamined Patent Application Publication No. 2019-061594
Patent Literature 2: Japanese Unexamined Patent Application Publication No. 2005-277462

SUMMARY OF INVENTION

Technical Problem

The above-described technologies determine the situation of the meeting on the basis of the speech contents at the meeting and the like. However, the target of the evaluation, the determination criteria, and the like change depending on the attributes of the meeting to be evaluated.

The present disclosure has been made in view of such problems, and an object of the present disclosure is to provide an analysis apparatus, an analysis method, an analysis system, and a program for effectively managing an online meeting.

Solution to Problem

An analysis apparatus according to an example embodiment of the present disclosure includes emotion data acquisition means, analysis data generation means, meeting data acquisition means, storage means, and message control means. The emotion data acquisition means acquires emotion data from an emotion data generation apparatus that generates emotion data from face image data of a meeting participant in an online meeting. The analysis data generation means generates analysis data for the meeting on the basis of the emotion data. The meeting data acquisition means acquires meeting data including attribute data of the meeting. The storage means stores message data in which a pattern of a message to be presented to a user is associated with the meeting data. The message control means selects the message on the basis of the analysis data and the message data, and stores an analysis result including the selected message in a storage unit in an outputtable manner.

In an application information processing method according to an example embodiment of the present disclosure, a computer executes the following method. The computer acquires emotion data that involves time data from an emotion data generation apparatus that generates the emotion data from face image data of a meeting participant in an online meeting. The computer generates analysis data for the meeting on the basis of the emotion data. The computer acquires meeting data including attribute data of the meeting. The computer stores message data in which a pattern of a message to be presented to a user is associated with the meeting data. The computer selects the message on the basis of the analysis data and the message data. The computer stores an analysis result including the selected message in an outputtable manner.

A program according to an example embodiment of the present disclosure causes a computer to execute the following steps. The computer acquires emotion data that involves time data from an emotion data generation apparatus that generates the emotion data from face image data of a meeting participant in an online meeting. The computer generates analysis data for the meeting on the basis of the emotion data. The computer acquires meeting data including attribute data of the meeting. The computer stores message data in which a pattern of a message to be presented to a user is associated with the meeting data. The computer selects the message on the basis of the analysis data and the message data. The computer stores an analysis result including the selected message in an outputtable manner.

Advantageous Effects of Invention

According to the present disclosure, it is possible to provide an analysis apparatus, an analysis method, an analysis system, and a program for effectively managing an online meeting.

BRIEF DESCRIPTION OF DRAWINGS

FIG. 9 is a diagram showing an example of message data.

EXAMPLE EMBODIMENT

Figure 1:
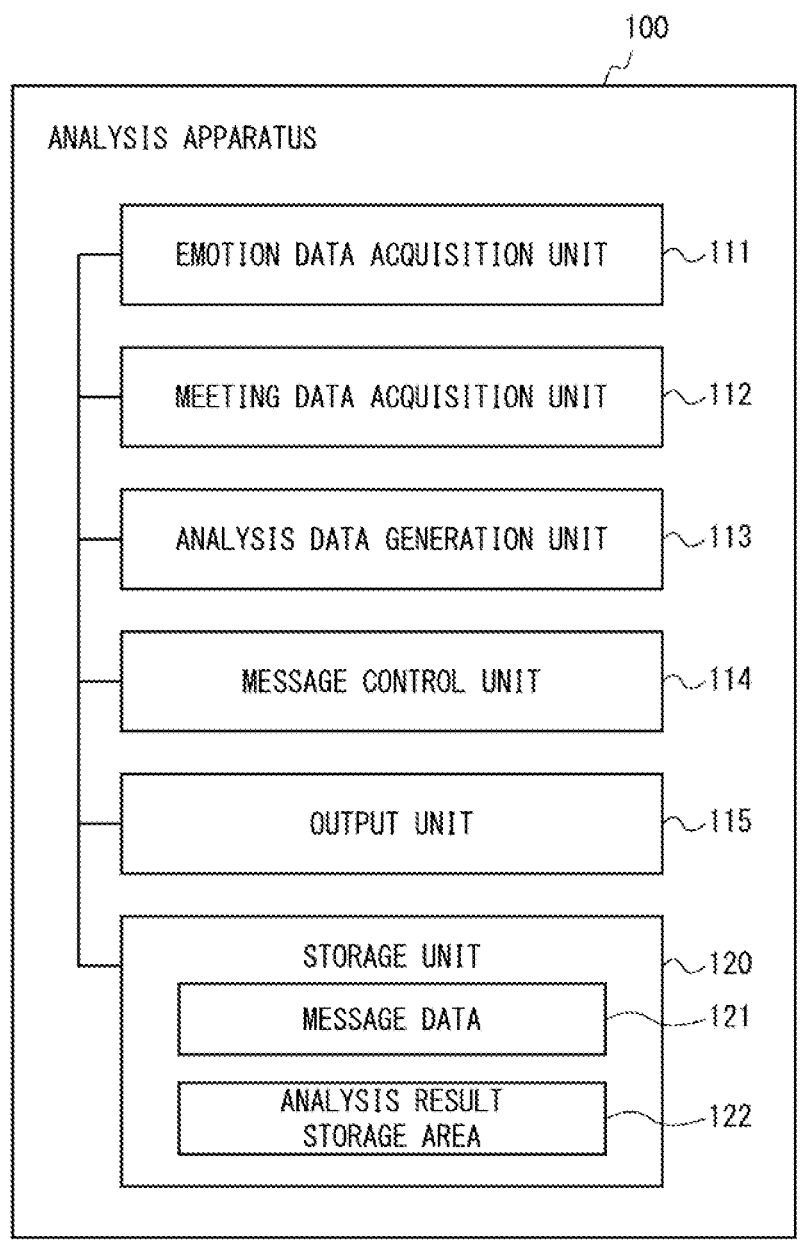
FIG. 1 is a block diagram showing a configuration of an analysis apparatus according to a first example embodiment.

Hereinafter, example embodiments of the present disclosure will be described in detail with reference to the drawings. In the drawings, the same or corresponding elements are denoted by the same reference numerals, and redundant description will be omitted as necessary for clarity of description.

First Example Embodiment

A first example embodiment will be described with reference to FIG. 1. FIG. 1 is a block diagram showing a configuration of an analysis apparatus 100 according to the first example embodiment. The analysis apparatus 100 acquires emotion data of a participant participating in an online meeting, generates analysis data regarding the online meeting from the acquired emotion data, and outputs the generated analysis data to a predetermined terminal or the like.

In the present example embodiment, the online meeting refers to a meeting held by using a plurality of meeting terminals communicatively connected to each other via a communication line. Meeting terminals that connect to the online meeting are, for example, personal computers, smartphones, tablet terminals, camera-equipped mobile phones, and the like. In addition, the meeting terminal is not limited to the above apparatuses as long as the meeting terminal is an apparatus including a camera that captures images of participants, a microphone that collects speech of the participants, and a communication function that transmits and receives image data or voice data. Furthermore, in the following description, the online meeting may be simply referred to as a "meeting".

In the present example embodiment, participants of the online meeting refer to persons who access the online meeting through the meeting terminal, and include the host of the meeting, speakers or presenters of the meeting, and observers of the meeting. For example, in a case where a plurality of persons are participating in a meeting through one meeting terminal, each of the plurality of persons is a participant. In the present example embodiment, it is assumed that participants participate in a meeting in a state where their face images can be captured by a camera built into the meeting terminal or connected to the meeting terminal.

The analysis apparatus 100 is communicatively connected to an emotion data generation apparatus that generates the emotion data of the participant in the online meeting and a meeting management apparatus that manages the meeting. In addition, the analysis apparatus 100 is communicatively connected to a terminal (user terminal) of a user who uses the analysis apparatus 100. The analysis apparatus 100 includes an emotion data acquisition unit 111, a meeting data acquisition unit 112, an analysis data generation unit 113, a message control unit 114, an output unit 115, and a storage unit 120 as main configurations.

The emotion data acquisition unit 111 acquires emotion data from the emotion data generation apparatus. The emotion data generation apparatus generates emotion data from face image data of the participants of the meeting in the online meeting, and supplies the generated emotion data to the analysis apparatus 100. The emotion data is data serving as an index indicating each emotion of the participants of the meeting.

The emotion data includes, for example, a plurality of items such as a level of attention, a level of confusion, a level of happiness, and surprise. That is, the emotion data indicates how much the participant feels these emotions for each of the above-described items. The emotion data acquired by the emotion data acquisition unit 111 involves time data. The emotion data generation apparatus generates emotion data for each predetermined period (for example, one second). The emotion data acquisition unit 111 acquires emotion data for each predetermined time throughout the progress time of the meeting. Upon acquiring the emotion data, the emotion data acquisition unit 111 supplies the acquired emotion data to the analysis data generation unit 113.

The meeting data acquisition unit 112 acquires meeting data from the meeting management apparatus. The meeting management apparatus is, for example, a server apparatus to which each of the participants of the meeting is communicatively connected. The meeting management apparatus may be included in a meeting terminal used by the participants of the meeting. The meeting data is data regarding a meeting that involves time data. More specifically, the meeting data includes a start time and an end time of the meeting. In addition, the meeting data includes a time of a break taken during the meeting.

The meeting data acquisition unit 112 acquires meeting data including attribute data of the meeting. The attribute data of the meeting may include, for example, information indicating a meeting type such as a webinar (also referred to as a web seminar or an online seminar), a regular meeting, or a brainstorming. In addition, the attribute data of the meeting may include information regarding the industry type and occupation type of the company to which the participants of the meeting belong. In addition, the attribute data of the meeting may include information regarding an agenda of the meeting, a purpose of the meeting, a name of the meeting body, or the like. The meeting data acquisition unit 112 supplies the acquired meeting data to the analysis data generation unit 113 and the message control unit 114.

The analysis data generation unit 113 generates analysis data for the meeting from the received emotion data, meeting data, and data indicating a chapter. The analysis data is data derived from emotion data, and is data extracted or calculated from items indicating a plurality of emotions. The analysis data is preferably an index that is useful for the management of the meeting. For example, the analysis data may include a level of attention, a level of empathy, and a level of understanding for the meeting. Alternatively, the analysis data may include the speaker's degree of emotional communication with respect to the observer of the meeting. In this manner, the analysis data generation unit 113 generates analysis data corresponding to a plurality of preset analysis items. Accordingly, the analysis apparatus 100 can generate analysis data from a plurality of viewpoints for efficiently holding a meeting.

Note that the analysis data generation unit 113 may set a method of calculating the analysis data according to the attribute data received from the meeting data acquisition unit 112. That is, in this case, the analysis data generation unit 113 selects a method of calculating the analysis data according to the attribute data received from the meeting data acquisition unit 112. Accordingly, the analysis apparatus 100 can calculate the analysis data according to the attributes of the meeting. After generating the analysis data, the analysis data generation unit 113 supplies the generated analysis data to the message control unit 114.

The message control unit 114 receives the analysis data from the analysis data generation unit 113 and reads message data 121 from the storage unit 120. Further, the message control unit 114 receives the meeting data from the meeting data acquisition unit 112. Then, the message control unit 114 selects a corresponding message from the received data and generates an analysis result including the selected message. The analysis result includes at least analysis data for the meeting and a message corresponding to the analysis data. The message control unit 114 causes the storage unit 120 to store the analysis result in an outputtable manner.

The output unit 115 outputs the analysis result stored in the storage unit 120 to the user terminal. The user who uses the analysis apparatus 100 can recognize how the participants feel about the content of the meeting, the speech of the presenter, or the like by perceiving the analysis result received by the user terminal. Furthermore, the user who uses the analysis apparatus 100 can recognize what kind of action the user should take for the next meeting by perceiving a message or advice included in the analysis result. Therefore, from the received analysis data, the user can perceive matters to be noted and the like for a meeting held thereafter.

The storage unit 120 is a storage apparatus including a non-volatile memory such as a solid state drive (SSD) or a flash memory. The storage unit 120 includes message data 121 and an analysis result storage area 122. The message data 121 is data in which a pattern of a message to be presented to the user is associated with meeting data. The analysis result storage area 122 is an area for storing the analysis result generated by the message control unit 114.

Figure 2:
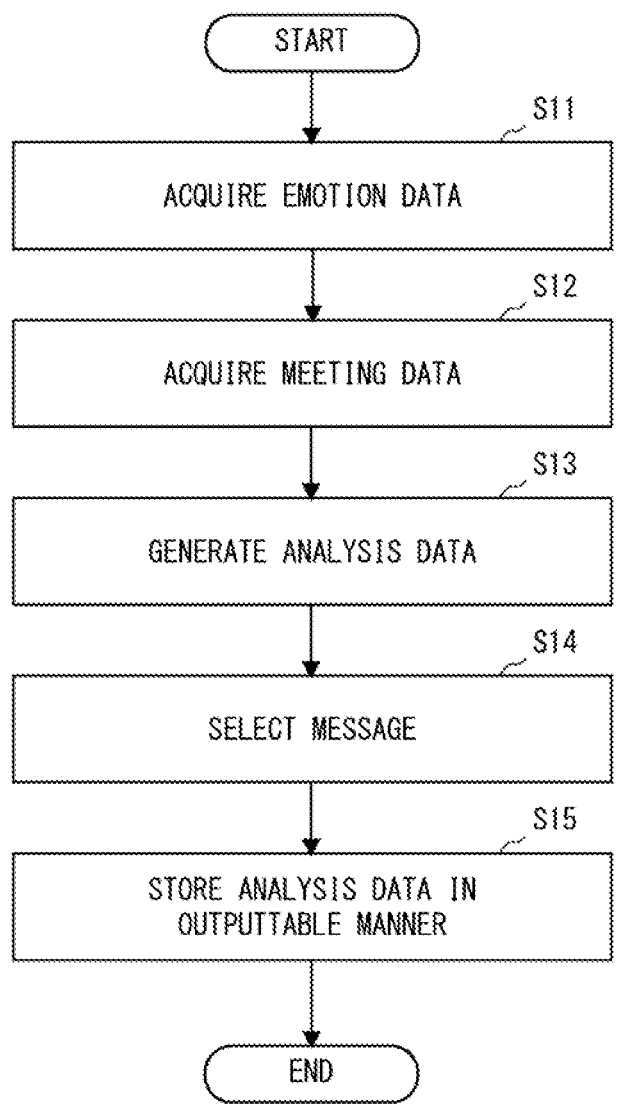
FIG. 2 is a flowchart showing an analysis method according to the first example embodiment.

Next, processing of the analysis apparatus 100 according to the first example embodiment will be described with reference to FIG. 2. FIG. 2 is a flowchart showing an analysis method according to the first example embodiment. The flowchart shown in FIG. 2 starts when, for example, analysis apparatus 100 receives a signal indicating the start of the meeting from the meeting management apparatus.

First, the emotion data acquisition unit 111 acquires emotion data from the emotion data generation apparatus (Step S11). The emotion data acquisition unit 111 may acquire the generated emotion data each time the emotion data generation apparatus generates the emotion data, or may collectively acquire the emotion data at a plurality of different times.

Next, the meeting data acquisition unit 112 acquires meeting data regarding the meeting that involves time data (Step S12). The meeting data acquisition unit 112 may receive such meeting data for each predetermined period (for example, one minute), or may sequentially receive the meeting data in a case where there is information to be updated in the meeting data. In addition, the meeting data acquisition unit 112 may receive the meeting data after the meeting ends.

Next, the analysis data generation unit 113 generates analysis data for the meeting from the emotion data received from the emotion data acquisition unit 111 and the meeting data received from the meeting data acquisition unit 112 (Step S13).

Next, the message control unit 114 selects a message corresponding to the analysis data from the message data 121 of the storage unit 120 (Step S14). Further, the message control unit 114 stores the analysis result including the selected message in the analysis result storage area 122 of the storage unit 120 in an outputtable manner (Step S15).

The processing performed by the analysis apparatus 100 has been described above. Note that, among the above-described processes, Step S11 and Step S12 may be performed in any order. Further, Step S11 and Step S12 may be executed in parallel. Alternatively, Step S11 and Step S12 may be alternately executed every predetermined period.

The first example embodiment has been described above. As described above, the analysis apparatus 100 according to the first example embodiment acquires the emotion data and the meeting data of the participants in the online meeting, and generates analysis data for the meeting. Then, the analysis apparatus 100 selects a message corresponding to the analysis data and stores the selected message in an outputtable manner. Thereby, the user who uses the analysis apparatus 100 can grasp the analysis result by the message corresponding to the analysis data in the online meeting. Therefore, according to the present example embodiment, it is possible to provide an analysis apparatus, an analysis method, an analysis system, and a program for effectively managing an online meeting.

Note that the analysis apparatus 100 includes a processor and a storage apparatus as a configuration not shown. The storage apparatus included in the analysis apparatus 100 includes a storage apparatus including a non-volatile memory such as a flash memory or an SSD. The storage apparatus included in the analysis apparatus 100 stores a computer program (hereinafter also simply referred to as a program) for executing the analysis method according to the present example embodiment. The processor also reads a computer program from the storage apparatus into the memory and executes the program.

Each configuration of the analysis apparatus 100 may be implemented by dedicated hardware. Also, some or all of the components may be implemented by a general-purpose or dedicated circuit (circuitry), processor, or the like, or a combination thereof. These may be composed of a single chip or may be composed of a plurality of chips connected via a bus. Some or all of the components of each apparatus may be implemented by a combination of the above-described circuit or the like and a program. Furthermore, a central processing unit (CPU), a graphics processing unit (GPU), a field-programmable gate array (FPGA), or the like can be used as the processor.

Furthermore, in a case where some or all of the components of the analysis apparatus 100 are implemented by a plurality of computation apparatuses, circuits, and the like, the plurality of computation apparatuses, circuits, and the like may be disposed in a centralized manner or in a distributed manner. For example, the computation apparatuses, the circuits, and the like may be implemented in a form in which each of them is connected via a communication network, such as a client server system or a cloud computing system. Furthermore, the function of the analysis apparatus 100 may be provided in a software as a service (SaaS) format.

Second Example Embodiment

Figure 3:
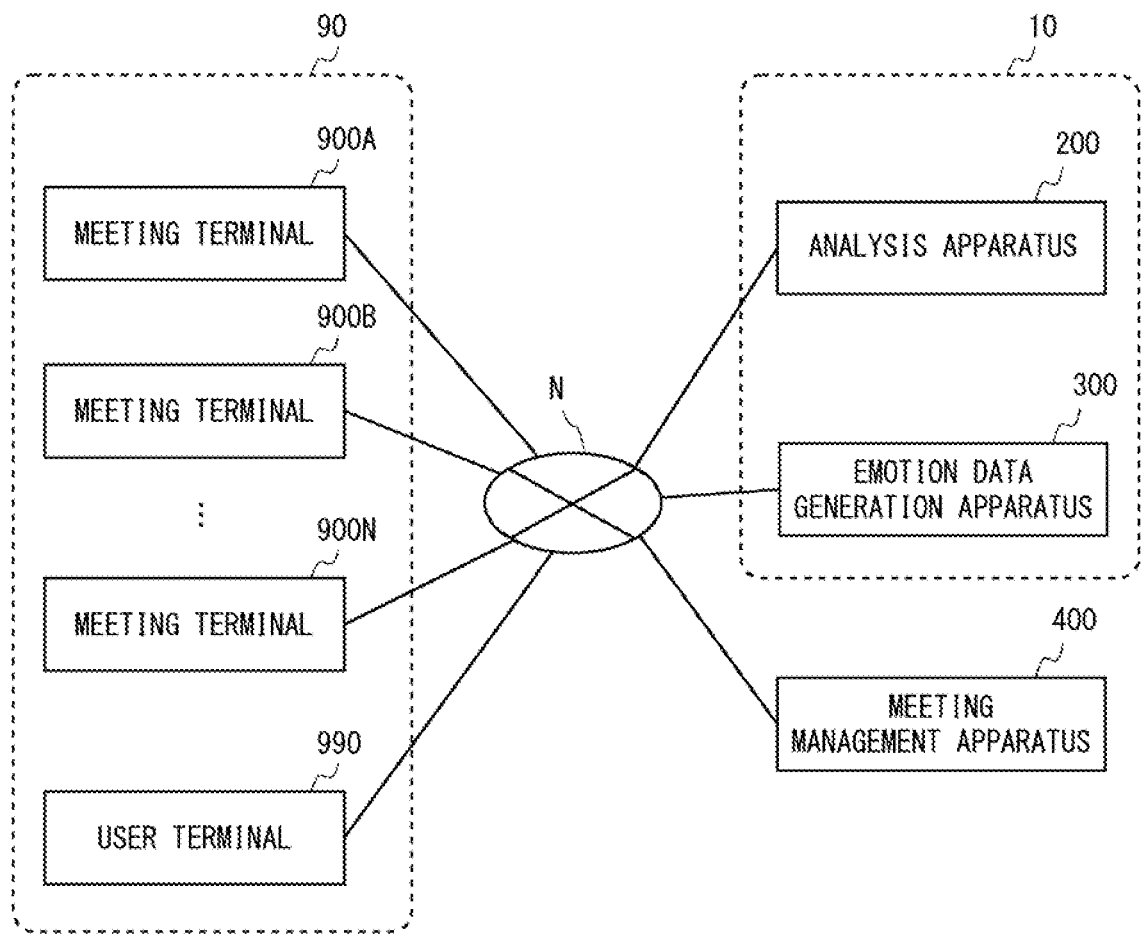
FIG. 3 is a block diagram showing a configuration of an analysis system according to a second example embodiment.

Next, a second example embodiment will be described. FIG. 3 is a block diagram showing a configuration of an analysis system according to the second example embodiment. An analysis system 10 shown in FIG. 3 includes an analysis apparatus 200 and an emotion data generation apparatus 300. The analysis apparatus 200 and the emotion data generation apparatus 300 are communicatively connected to each other via a network N. The analysis system 10 is communicatively connected to a meeting management apparatus 400 via a network N. The meeting management apparatus 400 is connected to a meeting terminal group 90 via the network N to manage an online meeting. The meeting terminal group 90 includes a plurality of meeting terminals (900A, 900B, . . . , 900N) and a user terminal 990.

Figure 4:
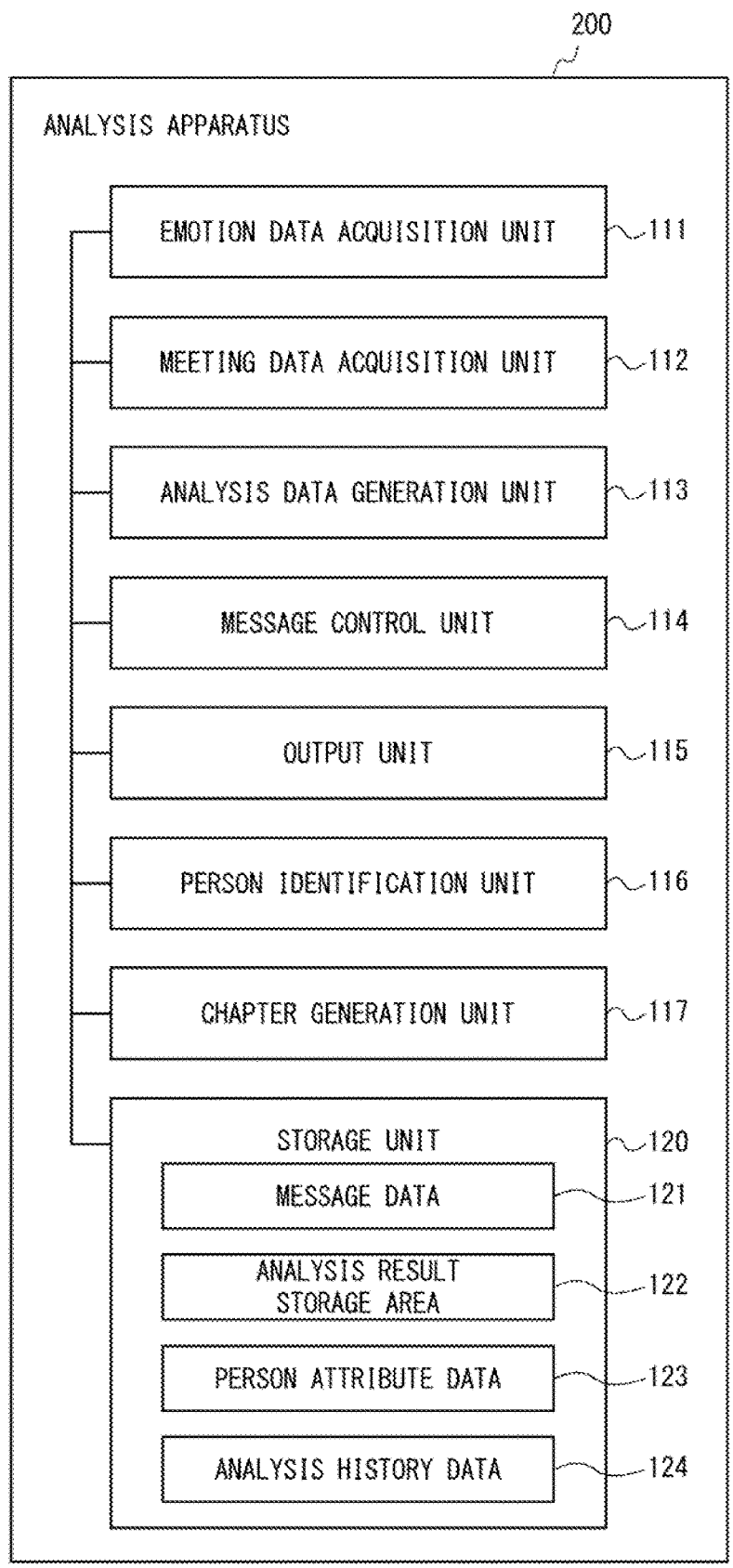
FIG. 4 is a block diagram showing a configuration of an analysis apparatus according to the second example embodiment.

Next, an analysis apparatus according to the second example embodiment will be described with reference to FIG. 4. FIG. 4 is a block diagram showing a configuration of the analysis apparatus 200 according to the second example embodiment. The analysis apparatus 200 according to the second example embodiment is different from the analysis apparatus 100 according to the first example embodiment in that it includes a person identification unit 116 and a chapter generation unit 117. Hereinafter, each configuration of the analysis apparatus 200 will be described including points different from the analysis apparatus 100.

The emotion data acquisition unit 111 according to the present example embodiment acquires emotion data in which a plurality of indices indicating emotional states are indicated by numerical values. The analysis data generation unit 113 generates analysis data by calculating a statistical value of the emotion data in a predetermined period. Note that the emotion data acquisition unit 111 can acquire emotion data including identification information of the meeting terminal. That is, in this case, the emotion data acquisition unit 111 can acquire the emotion data of each participant in a distinguishable manner. Therefore, for example, the emotion data acquisition unit 111 can acquire emotion data of a presenter and emotion data of a non-presenter in a meeting in a distinguishable manner.

Furthermore, the emotion data acquisition unit 111 can acquire emotion data that involves time data regarding a meeting. Since the venue data involves the time data, the emotion data acquisition unit 111 can acquire emotion data for generating analysis data for each chapter, for example, as will be described later.

The meeting data acquisition unit 112 acquires meeting data from the meeting management apparatus 400 that manages the meeting. The meeting data acquisition unit 112 acquires meeting data including attribute data of the meeting. In addition, the meeting data acquisition unit 112 can acquire the face image data of the participant from the meeting management apparatus 400. Furthermore, the meeting data acquisition unit 112 can acquire meeting data including data for identifying a presenter in a meeting.

The meeting data acquisition unit 112 may acquire meeting data including data regarding screen sharing in a meeting. In this case, the meeting data may include, for example, a time when the authority to operate the shared screen shared by the participants (the owner of the shared screen) is switched or a time when the speech of the participant is switched. The meeting data acquisition unit 112 may acquire meeting data including screen data shared in a meeting. In this case, the meeting data may include a time such as page turning in the shared screen or a change in the display image. Further, the meeting data may include what each of the above-described times indicates. The meeting data acquisition unit 112 supplies the acquired face image data to the person identification unit 116.

In addition, the meeting data acquisition unit 112 can acquire meeting data that involves time data. By acquiring the meeting data that involves time data, the meeting data acquisition unit 112 can acquire meeting data for generating analysis data for each chapter, for example, as will be described later.

The analysis data generation unit 113 generates analysis data for the meeting from the received emotion data and meeting data. In addition, the analysis data generation unit 113 can generate analysis data for the meeting for each chapter from the data indicating the chapter received from the chapter generation unit 117.

In addition, the analysis data generation unit 113 can generate analysis data by distinguishing between a presenter and a non-presenter. In this case, the analysis data generation unit 113 acquires the emotion data and the meeting data so that the participants can be distinguished. At this time, the meeting data includes data indicating which participant is a presenter in the meeting. Accordingly, the analysis data generation unit 113 can generate the respective pieces of analysis data after distinguishing the emotion data of the presenter from the emotion data of the non-presenter. The analysis data generation unit 113 supplies the analysis data generated as described above to the message control unit 114.

In addition, the analysis data generation unit 113 can generate analysis data including a relative comparison result corresponding to the attribute data of the meeting from attribute data of the meeting and analysis history data 124 stored in the storage unit 120. That is, the analysis data generation unit 113 extracts, from the analysis history data 124, analysis data having attribute data corresponding to attribute data included in the meeting data to be analyzed, and generates a relative comparison result. The analysis data generation unit 113 may preferentially extract the latest data from the analysis history data 124. In addition, the analysis data generation unit 113 may calculate statistical values of scores of the analysis data in the corresponding attribute data from the analysis history data 124 and then perform relative comparison.

In addition, in a case where data indicating a chapter is generated for the meeting, the analysis data generation unit 113 can generate analysis data for the meeting for each chapter. Accordingly, the analysis apparatus 200 can generate analysis data for each chapter and provide a message corresponding to the generated analysis data.

In a case where the analysis data received from the analysis data generation unit 113 includes a plurality of analysis items, the message control unit 114 can select a message based on the analysis item. For example, in a case where the analysis data includes scores for the respective analysis items of the level of attention, the level of empathy, and the level of understanding, the message control unit 114 can select a message for the score of the level of attention, a message for the level of empathy, and a message for the level of understanding, respectively. Accordingly, the analysis apparatus 200 can provide detailed messages or advice to the user.

The message control unit 114 can select, as a message, advice for the analysis data to fall within a range of a preset threshold value in a case where the analysis data exceeds the range of the threshold value. For example, it is assumed that the analysis data generation unit 113 generates a score of "level of understanding", which is an analysis item, by a numerical value from zero to 100, and that the larger the numerical value, the higher the level of understanding of the participant. Further, it is assumed that the message control unit 114 sets a threshold value of 50 for the level of understanding. In this case, when the analysis data of the level of understanding is less than 50, the message control unit 114 selects advice for making the score higher than 50 from the messages stored in the message data 121. For example, in this case, the message data 121 stores a message "Let's increase the level of understanding", and the message control unit 114 selects this message. With such a configuration, the analysis apparatus 200 can provide advice for an effective meeting to the user.

Upon receiving the analysis data in which the presenter and the non-presenter are distinguished from the analysis data generation unit 113, the message control unit 114 generates an analysis result including a message for the presenter from the received analysis data and stores the analysis result in the storage unit 120. With such a configuration, the analysis apparatus 200 selects messages for each of the analysis data of the presenter and the analysis data of the non-presenter. Therefore, the user can grasp the analysis data and the message from the respective viewpoints of the presenter and the non-presenter.

In addition, in a case where the analysis data is generated for each chapter, the message control unit 114 selects a message for each of the generated analysis data for each chapter. Accordingly, the analysis apparatus 200 can provide a message or advice for each chapter.

The person identification unit 116 can have a function of extracting face feature information of a person regarding the face image from the face image data and estimating a segmentation to which the person belongs according to the extracted information. The segmentation to which the person belongs indicates a feature or an attribute of the person, for example, the age or gender of the person. The person identification unit 116 uses the above-described function to identify a segmentation to which the participant belongs in the face image data received from the meeting data acquisition unit 112. The person identification unit 116 supplies data regarding the segmentation of the person to the analysis data generation unit 113.

In addition, the person identification unit 116 may identify a segmentation to which the identified participant belongs using the person attribute data 123 stored in the storage unit 120. In this case, the person identification unit 116 associates the face feature information extracted from the face image with the person attribute data 123, and identifies the segmentation of participants corresponding to the face feature information. The segmentation of the participant in this case is, for example, a corporation to which the participant belongs, a department in the corporation, an occupation type of the participant, or the like. With such a configuration, the analysis apparatus 200 can extract data that can be used for analysis data while considering privacy of participants.

In addition, the person identification unit 116 may identify a person regarding the face image from the face image data received from the meeting data acquisition unit 112. In this case, the person identification unit 116 associates the face feature information extracted from the face image with the person attribute data 123 stored in the storage unit 120, and identifies the participant corresponding to the face feature information. Accordingly, the person identification unit 116 can identify each of the participants of the meeting. By identifying the participants of the meeting, the analysis apparatus 200 can generate analysis data associated with the identified participants. Therefore, the analysis apparatus 200 can perform detailed analysis on the identified participant.

The chapter generation unit 117 generates a chapter for the meeting from the meeting data received from the meeting data acquisition unit 112. The chapter generation unit 117 detects, for example, a time from the start of the meeting to the end of the meeting, further detects a time that meets a preset condition, and generates data indicating a chapter with each time as a delimiter. The chapter of the meeting in the present disclosure is defined by whether a state that meets a predetermined condition is maintained in the meeting or whether the predetermined condition has changed. The chapter generation unit 117 may generate a chapter on the basis of, for example, data regarding screen sharing. More specifically, the chapter generation unit 117 may generate a chapter in accordance with a timing when the screen sharing is switched. Furthermore, the chapter generation unit 117 may generate a chapter in accordance with a time when the owner of the shared screen in the screen sharing is switched. The chapter generation unit 117 supplies data indicating the generated chapter to the analysis data generation unit 113.

The storage unit 120 is a storage apparatus including a non-volatile memory such as an SSD or a flash memory. The storage unit 120 stores the person attribute data 123 and the analysis history data 124 in addition to the message data 121 and the analysis result storage area 122.

The person attribute data 123 is data in which face feature information of a person is associated with information regarding a segmentation and an attribute of the person. The information regarding the segmentation and attribute of the person is, for example, the person's name, gender, age, occupation type, corporation to which the person belongs, or department to which the person belongs, but the present disclosure is not limited thereto.

The analysis history data 124 is analysis data regarding analysis executed by the analysis apparatus 200 in the past, that is, analysis data generated by the analysis data generation unit 113 of the analysis apparatus 200 in the past. In addition to the above-described data, the storage unit 120 stores, for example, a program for executing the analysis method according to the present example embodiment.

Figure 5:
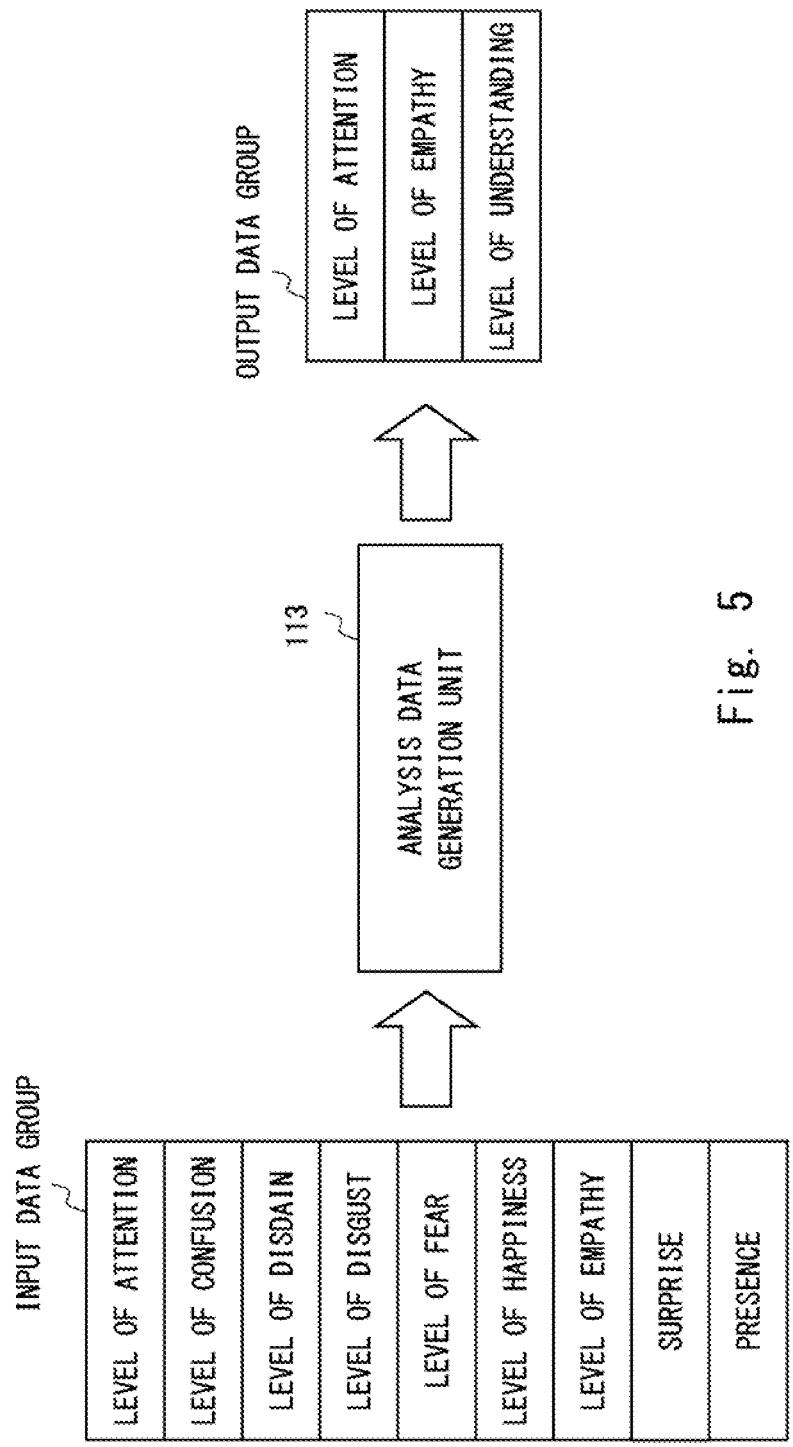
FIG. 5 is a diagram showing an example of data processed by an analysis data generation unit.

The analysis data generation unit 113 will be further described with reference to FIG. 5. FIG. 5 is a diagram showing an example of data processed by the analysis data generation unit. FIG. 5 shows an input data group received by the analysis data generation unit 113 and an output data group output by the analysis data generation unit 113. The analysis data generation unit 113 receives emotion data as an input data group from the emotion data generation apparatus 300. The input data group includes, for example, indices regarding a level of attention, a level of confusion, a level of disdain, a level of disgust, a level of fear, a level of happiness, a level of empathy, surprise, and presence. These indices are indicated by numerical values from 0 to 100, for example. The index shown here indicates that, for example, the larger the value, the greater the reaction of the participant to the emotion. The emotion data of the input data group may be generated from face image data using an existing video processing technology for acquiring, or may be generated and acquired by another method.

Upon receiving the above-described input data group, the analysis data generation unit 113 performs preset processing and generates an output data group using the input data group. The output data group is data that is referred to by a user who uses the analysis system 10 to efficiently hold a meeting. The output data group includes, for example, a level of attention, a level of empathy, and a level of understanding. The analysis data generation unit 113 extracts a preset index from the input data group. In addition, the analysis data generation unit 113 performs preset calculation processing on the value regarding the extracted index. Then, the analysis data generation unit 113 generates the above-described output data group. Note that the level of attention indicated as the output data group may be the same as or different from the level of attention included in the input data group. Similarly, the level of empathy indicated as the output data group may be the same as or different from the level of empathy included in the input data group.

Figure 6:
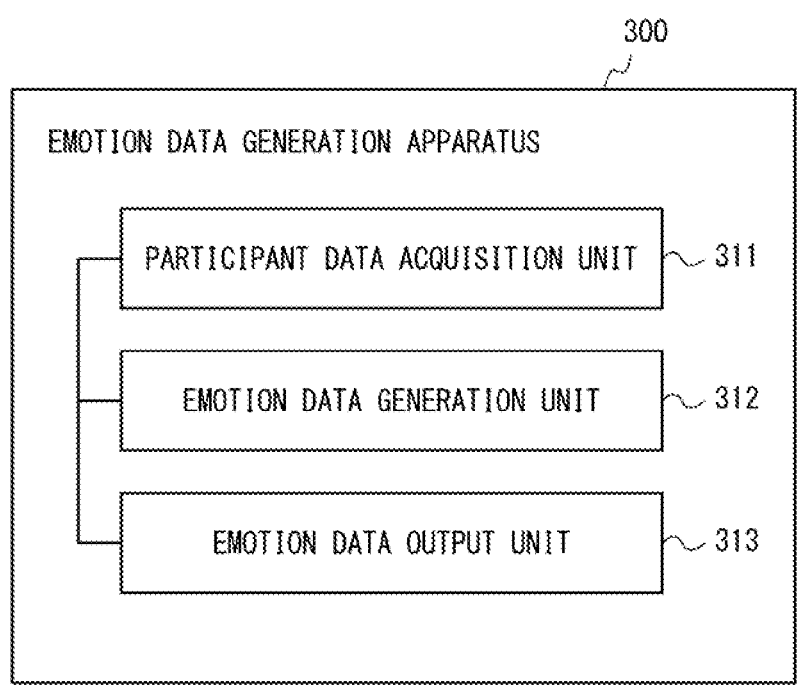
FIG. 6 is a block diagram showing a configuration of an emotion data generation apparatus according to the second example embodiment.

Next, the emotion data generation apparatus 300 will be described with reference to FIG. 6. FIG. 6 is a block diagram showing a configuration of the emotion data generation apparatus according to the second example embodiment. The emotion data generation apparatus 300 includes a participant data acquisition unit 311, an emotion data generation unit 312, and an emotion data output unit 313 as main configurations.

The participant data acquisition unit 311 acquires data regarding the participants from the meeting management apparatus 400. The data regarding the participant is face image data of the participant captured by the meeting terminal. The emotion data generation unit 312 generates emotion data from the face image data received by the emotion data generation apparatus 300. The emotion data output unit 313 outputs the emotion data generated by the emotion data generation unit 312 to the analysis apparatus 200 via the network N. The emotion data generation apparatus 300 generates the emotion data by performing predetermined image processing on the face image data of the participant. The predetermined image processing is, for example, extraction of a feature point (or a feature amount), collation of the extracted feature point with reference data, convolution processing of image data, processing using machine-learned training data, processing using training data by deep learning, and the like. However, the method by which the emotion data generation apparatus 300 generates the emotion data is not limited to the above-described processing. The emotion data may be a numerical value that is an index indicating an emotion or may include image data used in generating the emotion data.

Note that the data regarding the participants may include data for distinguishing the participants. For example, the data regarding the participants may include an identifier of a meeting terminal that has captured the face image data of the participant. Accordingly, the emotion data generation unit 312 can generate the emotion data in a state where the participants can be distinguished. Then, the emotion data output unit 313 generates the emotion data corresponding to the meeting terminal so that each meeting terminal can be distinguished, and supplies the emotion data to the emotion data acquisition unit 111.

Note that the emotion data generation apparatus 300 includes a processor, a memory, and a storage apparatus as configurations not shown. The storage apparatus included in the emotion data generation apparatus 300 stores a program for executing emotion data generation according to the present example embodiment. The processor also reads the program from the storage apparatus into the memory and executes the program.

Each configuration of the emotion data generation apparatus 300 may be implemented by dedicated hardware. Also, some or all of the components may be implemented by a general-purpose or dedicated circuit, processor, or the like, or a combination thereof. These may be composed of a single chip or may be composed of a plurality of chips connected via a bus. Some or all of the components of each apparatus may be implemented by a combination of the above-described circuit or the like and a program. In addition, a CPU, a GPU, an FPGA, or the like can be used as the processor.

Furthermore, in a case where some or all of the components of the emotion data generation apparatus 300 are implemented by a plurality of computation apparatuses, circuits, and the like, the plurality of computation apparatuses, circuits, and the like may be disposed in a centralized manner or in a distributed manner. For example, the computation apparatuses, the circuits, and the like may be implemented in a form in which each of them is connected via a communication network, such as a client server system or a cloud computing system. Furthermore, the function of the emotion data generation apparatus 300 may be provided in a SaaS format.

Figure 7:
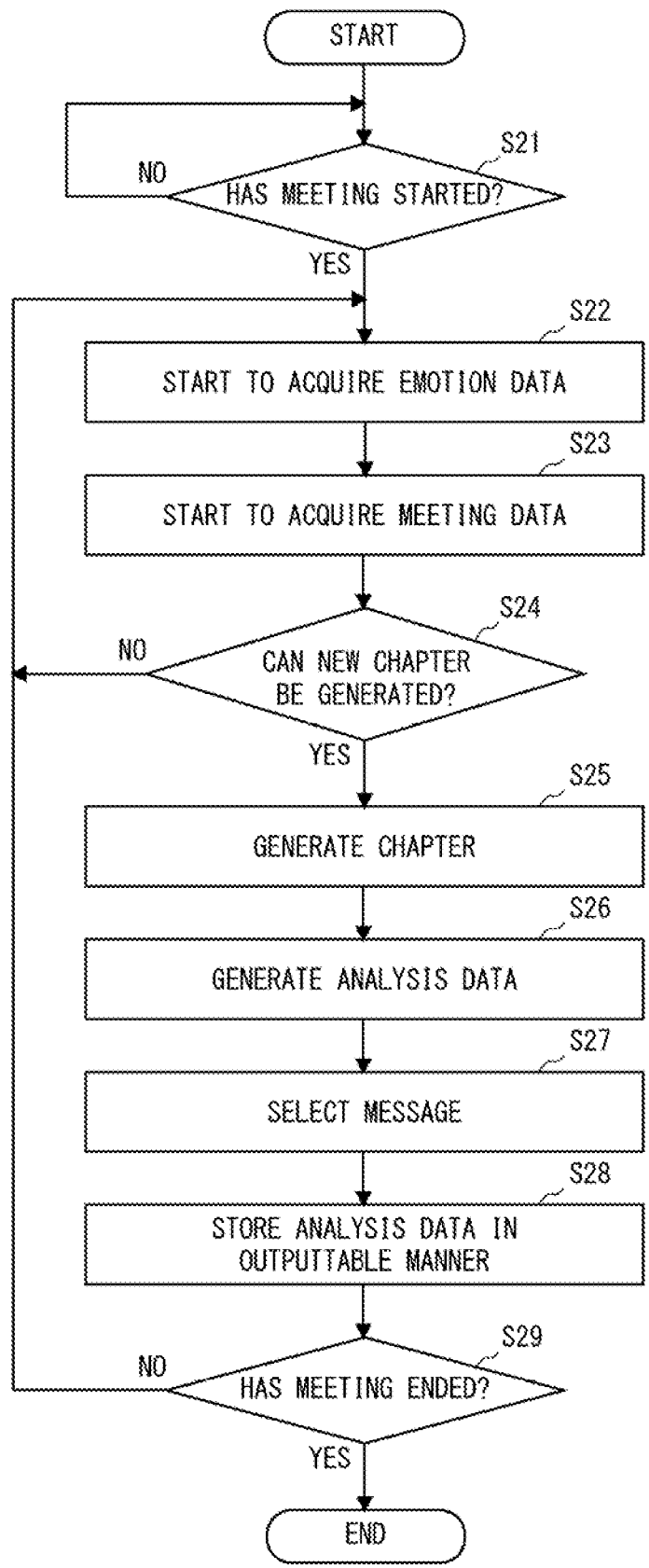
FIG. 7 is a flowchart showing an analysis method according to the second example embodiment.

Next, processing executed by the analysis apparatus 200 will be described with reference to FIG. 7. FIG. 7 is a flowchart showing an analysis method according to the second example embodiment. The processing shown in FIG. 7 is different from the processing according to the first example embodiment in that analysis data is output each time a new chapter is generated in an ongoing meeting.

First, the analysis apparatus 200 determines whether or not an online meeting has started (Step S21). The analysis apparatus 200 determines the start of the meeting by receiving a signal indicating that the meeting has started from the meeting management apparatus 400. In a case where it is determined that the online meeting has not started (Step S21: NO), the analysis apparatus 200 repeats Step S21. In a case where it is determined that the online meeting has started (Step S21: YES), the analysis apparatus 200 proceeds to Step S22.

In Step S22, the emotion data acquisition unit 111 starts to acquire emotion data from the emotion data generation apparatus (Step S22). The emotion data acquisition unit 111 may acquire the generated emotion data each time the emotion data generation apparatus generates the emotion data, or may collectively acquire the emotion data at a plurality of different times.

Next, the meeting data acquisition unit 112 acquires meeting data regarding the meeting that involves time data (Step S23). The meeting data acquisition unit 112 may receive such meeting data for each predetermined period (for example, one minute), or may sequentially receive the meeting data in a case where there is information to be updated in the meeting data.

Next, the analysis apparatus 200 determines whether or not a new chapter can be generated from the received meeting data (Step S24). In a case where it is determined that a new chapter cannot be generated (Step S24: NO), the analysis apparatus 200 returns to Step S22. On the other hand, in a case where it is determined that a new chapter can be generated (Step S24: YES), the analysis apparatus 200 proceeds to Step S25.

In Step S25, the chapter generation unit 117 generates a chapter from the meeting data received from the meeting data acquisition unit 112 (Step S25).

Next, the analysis data generation unit 113 generates analysis data for a newly generated chapter from the emotion data received from the emotion data acquisition unit 111, the meeting data received from the meeting data acquisition unit 112, the data indicating the chapter received from the chapter generation unit 117, and the data received from the person identification unit 116 (Step S26).

Next, the message control unit 114 selects a message corresponding to the analysis data from the message data 121 of the storage unit 120 (Step S27). Further, the message control unit 114 stores the analysis result including the selected message in the analysis result storage area 122 of the storage unit 120 in an outputtable manner (Step S28).

Next, the analysis apparatus 200 determines whether or not the meeting has ended (Step S29). The analysis apparatus 200 determines the end of the meeting by receiving a signal indicating that the meeting has ended from the meeting management apparatus 400. In a case where it is determined that the meeting has not ended (Step S29: NO), the analysis apparatus 200 returns to Step S22 and continues the process. On the other hand, in a case where it is determined that the online meeting has ended (Step S29: YES), the analysis apparatus 200 ends a series of processes.

The processing of the analysis apparatus 200 according to example embodiment 2 has been described above. According to the above-described flowchart, the analysis apparatus 200 can generate analysis data for a chapter generated each time a new chapter is generated in an ongoing meeting, and select a message corresponding to the generated analysis data. Accordingly, the user who uses the analysis system 10 can effectively proceed with the meeting by using a message or advice provided each time a new chapter is generated in the ongoing meeting. Alternatively, the user can achieve smooth communication by using a message or advice provided each time a new chapter is generated in an ongoing meeting.

Figure 8:
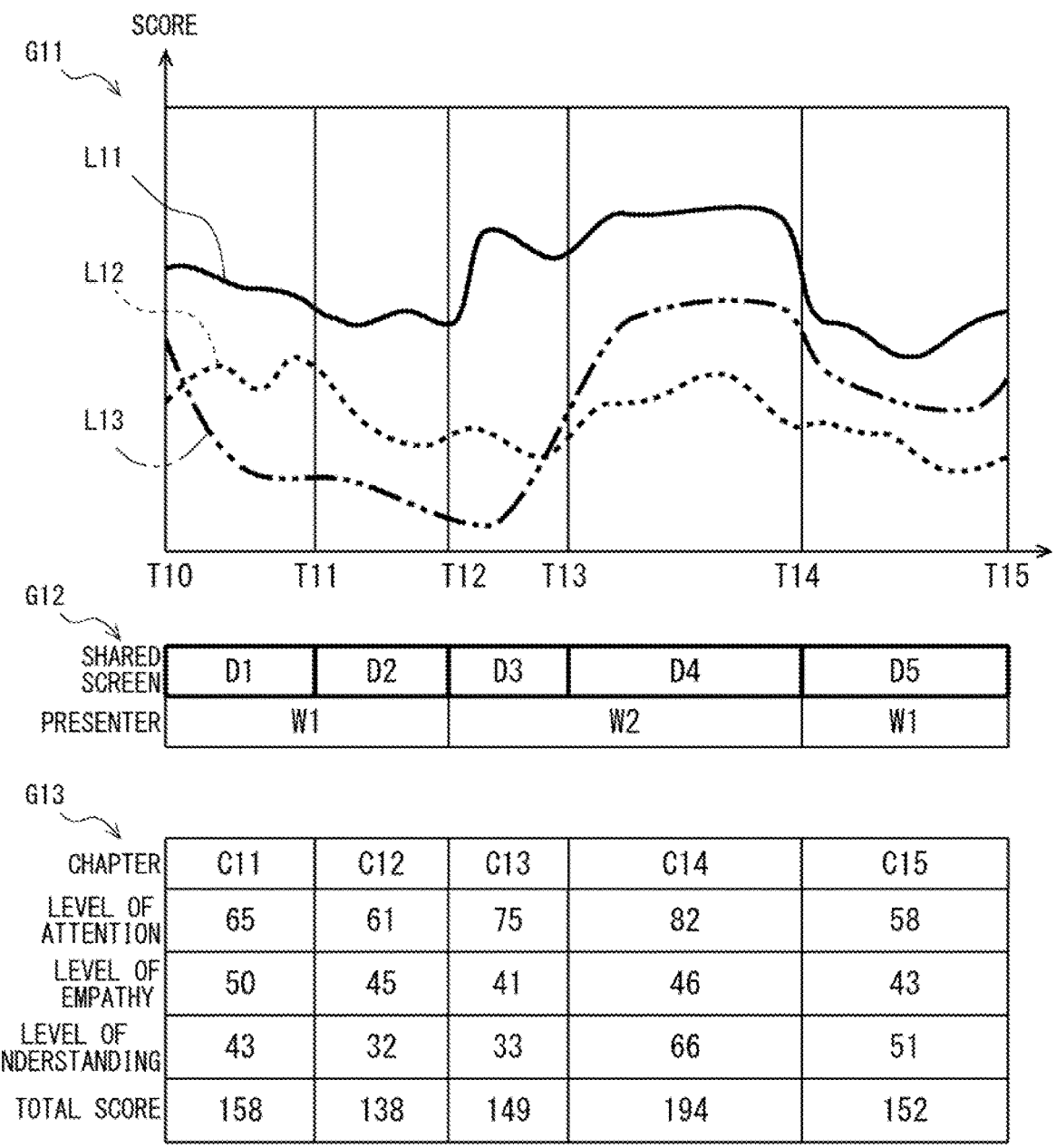
FIG. 8 is a diagram showing an example of analysis data.

Next, an example of analysis data generated by the analysis data generation unit 113 will be described with reference to FIG. 8. FIG. 8 is a diagram showing an example of analysis data. In FIG. 8, a graph G11 showing the analysis data in the time series is shown in the upper part. In addition, meeting data G12 corresponding to the above time series is shown in the middle part. Furthermore, in the lower part, analysis data G13 for each chapter corresponding to the meeting data is shown.

In the graph G11, the horizontal axis represents time, and the vertical axis represents the score of the analysis data. In the horizontal axis, the left end is time T10, the time passes as it goes to the right, and the right end is time T15. Time T10 is a start time of the meeting, and time T15 is an end time of the meeting. Times T11, T12, T13, and T14 between time T10 and time T15 indicate times corresponding to chapters to be described later.

In the graph G11, first analysis data L11 indicated by a solid line, second analysis data L12 indicated by a dotted line, and third analysis data L13 indicated by a two-dot chain line are plotted. The first analysis data L11 indicates the level of attention in the analysis data. The second analysis data L12 indicates the level of empathy in the analysis data. The third analysis data L13 indicates the level of understanding of the analysis data.

In the meeting data G12, data regarding a shared screen of a meeting and data regarding a speaker (presenter) are shown in the time series. That is, the data regarding the display screen indicates that the shared screen from time T10 to time T11 was a screen D1. In addition, the data regarding the display screen indicates that the shared screen from time T11 to time T12 was a screen D2. Similarly, according to the meeting data G12, the shared screen in the meeting indicates that the screen from time T12 to time T13 was a screen D3, the screen from time T13 to time T14 was a screen D4, and the screen from time T14 to time T15 was a screen D5.

In addition, in the meeting data G12, the data regarding the presenter indicates that a period from time T10 to time T12 was a presenter W1. Similarly, the data regarding the presenter indicates that a period from time T12 to time T14 was a presenter W2, and a period from time T14 to time T15 was the presenter W1 again.

The relationship between the shared screen and the presenter in the above-described meeting data G12 will be described in the time series. The presenter W1 progressed the meeting during a period from time T10 when the meeting was started to time T12, and the presenter W1 displayed the screen D1 as a shared screen (that is, shares the screen D1) as the shared screen during a period from time T10 to time T11. Next, during a period from time T11 to time T12, the presenter W1 switched the shared screen from the screen D1 to the screen D2 and continued the presentation. Next, at time T12, the presenter was replaced from the presenter W1 to the presenter W2. The presenter W2 shared the screen D3 during a period from time T12 to time T13, and shared the screen D4 during a period from time T13 to time T14. During a period from time T14 to time T15, the presenter W1 replaced from the presenter W2 shared the screen D5.

The relationship between the shared screen and the presenter in the meeting data G12 has been described above in the time series. As described above, the meeting data shown in FIG. 8 includes data regarding a period in which the screen data on the shared screen has been displayed and data regarding who the presenter is. The chapter generation unit 117 generates a chapter according to data regarding the shared screen in the above-described meeting data.

In the analysis data G13, data indicating a chapter corresponding to the above-described meeting data and analysis data corresponding to the chapter are shown in the time series. In the example shown in FIG. 8, the data indicating the chapter corresponds to data regarding the shared screen in the meeting data. That is, a first chapter C11 is a period from time T10 to time T11 during which the screen D1 has been shared. Similarly, a second chapter C12 is a period from time T11 to time T12 during which the screen D2 has been shared. A third chapter C13 is a period from time T12 to time T13 during which the screen D3 has been shared. A fourth chapter C14 is a period from time T13 to time T14 during which the screen D4 has been shared. A fifth chapter C15 is a period from time T14 to time T15 during which the screen D5 has been shared.

As shown in FIG. 8, the analysis data G13 includes analysis data corresponding to each chapter. The analysis data indicates a level of attention, a level of empathy, a level of understanding, and a total score obtained by summing these. In the analysis data G13, for example, as the analysis data corresponding to the chapter C11, the level of attention is indicated as 65, the level of empathy is indicated as 50, and the level of understanding is indicated as 43. In addition, the total score is indicated as 158 as the sum of these scores. Similarly, for example, as the analysis data corresponding to the chapter C12, the level of attention is indicated as 61, the level of empathy is indicated as 45, the level of understanding is indicated as 32, and the total score is indicated as 138.

The analysis data corresponds to the data plotted in the graph G11. That is, the analysis data indicated as the analysis data G13 is an average value of the analysis data calculated every predetermined period (for example, one minute) in the period of the corresponding chapter.

The example of the analysis data has been described above. In the example shown in FIG. 8, the chapter generation unit 117 sets the timing when the shared screen is switched in the meeting data as a timing when the chapter is switched. Then, the analysis data generation unit 113 calculates the analysis data from the start of the meeting to the end of the meeting for each chapter described above. Thereby, the analysis system 10 can provide analysis data for each displayed shared screen.

In the example shown in FIG. 8, the analysis system 10 calculates and plots the analysis data every predetermined period as shown in the graph G11 described above. Accordingly, the analysis system 10 can indicate a detailed change in the analysis data in the meeting. However, instead of the calculation as shown in the graph G11, the analysis data generation unit 113 may first calculate a statistical value (for example, an average value) of the emotion data in the chapter after the chapter ends, and then calculate the analysis data. With such a configuration, the analysis system 10 can improve the processing speed of the analysis data.

In the above-described example, the chapter generation unit 117 generates a chapter in accordance with data regarding the shared screen among the meeting data in the meeting data G12. However, the chapter generation unit 117 may generate a chapter at a timing when the presenter is switched.

Next, the message data 121 will be described with reference to FIG. 9. FIG. 9 is a diagram showing an example of message data. The table shown in FIG. 9 shows a meeting type, an analysis item, a score, and a message.

The meeting type is an item included in the attribute data of the meeting, and is for classifying the meeting into a preset type. In the message data 121 shown in FIG. 9, items of "seminar" and "problem countermeasure meeting" are shown as meeting types. In addition to this, the meeting type may include, for example, "brainstorming", "kickoff meeting", "regular meeting", "management meeting", and the like, but is not limited to the above items.

In the message data 121 shown in FIG. 9, "level of attention" and "level of empathy" are indicated as analysis items corresponding to "seminar". This indicates that a message is selected focusing on the "level of attention" and the "level of empathy" among the analysis items included in the analysis data in a meeting in which the meeting type is classified as a seminar.

In the table shown in FIG. 9, the score "50-100" and the score "0-49" are indicated on the right side of the "level of attention". Furthermore, on the right side of each score, "Attention has been paid" and "Let's attract attention" are indicated as corresponding messages. These indicate that, in a case where the score of the "level of attention" as the analysis item is "50 to 100" in the meeting type "seminar", "Attention has been paid" can be selected as the message. Similarly, these indicate that, in a case where the score of the "level of attention" as the analysis item is "0 to 49" in the meeting type "seminar", "Let's attract attention" can be selected as the message.

In the table shown in FIG. 9, "level of empathy of presenter" and "level of empathy of non-presenter" are indicated as analysis items of "seminar". Furthermore, "0-40" is indicated in the score corresponding to the "level of empathy of presenter", and "Let's increase the smile of the presenter" is further indicated as the message. Furthermore, "0-30" is indicated in the score corresponding to the "level of empathy of non-presenter", and "Let's increase the smile of the observer" is further indicated as the message.

Furthermore, in the column under the meeting type "seminar", "problem countermeasure meeting" is indicated. The analysis items corresponding to the problem countermeasure meeting indicate an "level of empathy" and an "level of understanding". The score corresponding to the level of empathy in the problem countermeasure meeting is indicated as "0-40", and the corresponding message is indicated as "Level of empathy seems to be low". Furthermore, the score corresponding to the level of understanding is indicated as "36-60", and the corresponding message is indicated as "Let's check the level of understanding of the participant".

As described above, in the example shown in FIG. 9, the message data 121 stores the meeting type, the analysis item, the score of the analysis item, and the message in association with each other. The message control unit 114 collates the meeting data received from the meeting data acquisition unit 112, the analysis data received from the analysis data generation unit 113, and the message data 121 to select a corresponding message. Therefore, the analysis apparatus 200 can provide the user with a message appropriately selected according to the attribute data of the meeting, the score of the analysis data, and the like. In the message data 121, for example, a meeting title, a host, a meeting purpose, or the like may be employed as the attribute data of the meeting in addition to the meeting type.

Figure 10:
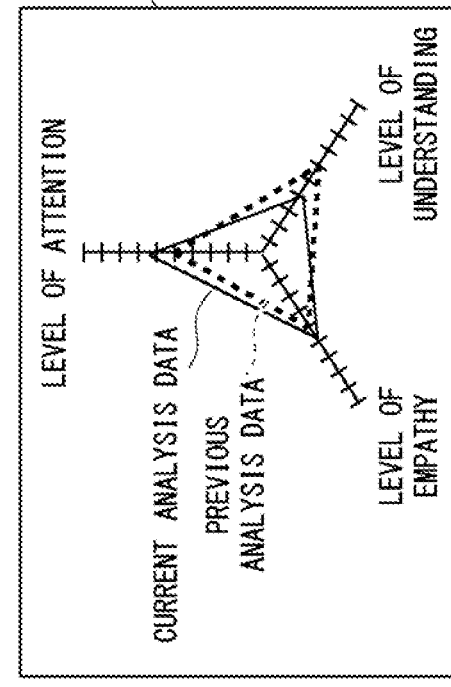
FIG. 10 is a diagram showing a display example of an analysis result.

Next, an example of an analysis result will be described with reference to FIG. 10. FIG. 10 is a diagram showing a display example of an analysis result. FIG. 10 shows an analysis result K10 generated by the message control unit 114. The analysis result K10 is a screen configured to be displayable on a display apparatus included in the user terminal 990. The analysis result K10 includes a first display portion K11, a second display portion K12, a third display portion K13, a fourth display portion K14, and a fifth display portion K15.

The first display portion K11 displays a meeting type and a meeting name. The second display portion K12 displays a holding date and time and a presenter of a meeting. The data displayed in the first display K11 and the second display are included in the meeting data received from the meeting data acquisition unit 112.

The third display portion K13 displays a message selected by the message control unit 114. In FIG. 10, "selection range: chapter #1" is displayed on the third display portion K13. That is, the message displayed on the third display portion K13 in FIG. 10 is a message corresponding to the chapter #1 in the meeting. On the third display portion K13, "Level of attention is relatively high", "Level of empathy is medium", and "Level of understanding is lower than the previous time" are displayed as "analysis result message". Further, on the third display portion K13, "Let's check the level of understanding of the participant" is displayed as "advice for the future".

On the fourth display portion K14, the analysis data in the chapter #1 is shown as a radar chart. In the radar chart shown in the fourth display portion K14, the analysis data of the chapter #1 is plotted by a solid line as "current analysis data". Further, in the radar chart shown in the fourth display portion K14, the analysis data in the previous meeting is plotted by a dotted line as "previous analysis data". The previous analysis data is analysis data in a similar meeting type held in the past, and is data stored in the analysis history data 124. As shown in the figure, the message control unit 114 uses the analysis history data 124 to relatively compare the analysis data as a graph or a chart. Thus, the analysis apparatus 200 can show data that is easy to intuitively understand.

The fifth display portion K15 indicates analysis data of the entire meeting and analysis data calculated for each chapter. In the fifth display portion K15, the chapter #1 surrounded by a thick line is indicated as the level of attention of 65, the level of empathy of 50, and the level of understanding of 43. These values correspond to the radar chart shown on the fourth display portion K14. These values correspond to the message and the advice displayed on the third display portion K13.

Note that, in a case where the analysis result K10 is displayed on the user terminal 990, for example, when the user selects an arbitrary chapter or an entire area of the fifth display portion K15, data corresponding to the selected area is displayed as content of the third display portion K13 and the fourth display portion K14.

The example of the analysis result has been described above. The analysis apparatus 200 can generate messages of various modes in addition to the above-described content. For example, the analysis apparatus 200 may express the tendency of the analysis data as a color tone and include an image with such a color tone in the message.

Although the second example embodiment has been described above, the analysis system 10 according to the second example embodiment is not limited to the above-described configuration. For example, the analysis system 10 may include the meeting management apparatus 400. In this case, the analysis apparatus 200, the emotion data generation apparatus 300, and the meeting management apparatus 400 may exist separately, or some or all of them may be integrated. Furthermore, for example, the function of the emotion data generation apparatus 300 is configured as a program, and may be included in the analysis apparatus 200 or the meeting management apparatus 400.

The aforementioned program can be stored and supplied to the computer using various types of non-transitory computer readable media. Non-transitory computer readable media include various types of tangible storage media. Examples of the non-transitory computer readable media include a magnetic recording medium (for example, a flexible disk, a magnetic tape, or a hard disk drive), a magneto-optical recording medium (for example, a magneto-optical disk), a compact disc-read only memory (CD-ROM), a CD-R, a CD-R/W, and a semiconductor memory (for example, a mask ROM, a programmable ROM (PROM), an erasable PROM (EPROM), a flash ROM, or a random access memory (RAM). Further, the program may be supplied to the computer using various types of transitory computer readable media. Examples of the transitory computer readable media include electrical signals, optical signals, and electromagnetic waves. The transitory computer readable media can provide the program to the computer via a wired communication line such as an electric wire and optical fibers or a wireless communication line.

The present invention is not limited to the above example embodiments, and can be appropriately changed without departing from the scope of the present invention.

Some or all of the above example embodiments can be described as the following supplementary notes, but are not limited to the following.

(Supplementary Note 1)

An analysis apparatus including:

emotion data acquisition means for acquiring emotion data from an emotion data generation apparatus that generates the emotion data from face image data of a meeting participant in an online meeting;

analysis data generation means for generating analysis data for the meeting based on the emotion data;

meeting data acquisition means for acquiring meeting data including attribute data of the meeting;

storage means for storing message data in which a pattern of a message to be presented to a user is associated with the meeting data; and message control means for selecting the message based on the analysis data and the message data and storing an analysis result including the selected message in the storage means in an outputtable manner.

(Supplementary Note 2)

The analysis apparatus according to Supplementary Note 1, wherein the analysis data generation means selects a method of calculating the analysis data based on the attribute data and generates the analysis data.

(Supplementary Note 3)

The analysis apparatus according to Supplementary Note 1 or 2, wherein the analysis data generation means generates a plurality of preset analysis items, the storage means stores message data set based on the plurality of analysis items, and the message control means selects a message based on the analysis item for the meeting.

(Supplementary Note 4)

The analysis apparatus according to any one of Supplementary Notes 1 to 3, wherein the storage means further stores analysis history data regarding the analysis result generated in the past, and the analysis data generation means generates the analysis data including a relative comparison result of the meeting corresponding to the attribute data based on the attribute data and the analysis history data.

(Supplementary Note 5)

The analysis apparatus according to any one of Supplementary Notes 1 to 4, wherein the emotion data acquisition means acquires the emotion data of a presenter and the emotion data of a non-presenter in the meeting in a distinguishable manner, the meeting data acquisition means acquires the meeting data including data for identifying a presenter in the meeting, the analysis data generation means generates the analysis data by distinguishing between the presenter and the non-presenter, and the message control means causes the storage means to store the analysis result including a message for the presenter in an outputtable manner based on a result of the distinction.

(Supplementary Note 6)

The analysis apparatus according to any one of Supplementary Notes 1 to 4, further including person identification means for identifying a person based on face image data, wherein the meeting data acquisition means acquires face image data of the participant, the person identification means identifies a segmentation to which the participant belongs from the face image data, and the analysis data generation means generates the analysis data in consideration of the segmentation.

(Supplementary Note 7)

The analysis apparatus according to any one of Supplementary Notes 1 to 4, further including person identification means for identifying a person based on face image data, wherein the meeting data acquisition means acquires face image data of the participant, the person identification means identifies the participant from the face image data, and the analysis data generation means generates the analysis data of the participant related to the identification.

(Supplementary Note 8)

The analysis apparatus according to any one of Supplementary Notes 1 to 7, wherein the message control means selects, as the message, advice for the analysis data to fall within a range of a preset threshold value in a case where the analysis data exceeds the range of the threshold value.

(Supplementary Note 9)

The analysis apparatus according to any one of Supplementary Notes 1 to 8, further including chapter generation means for generating a chapter for the meeting, wherein
the emotion data acquisition means acquires the emotion data that involves time data regarding the meeting,
the meeting data acquisition means further acquires meeting data regarding the meeting that involves time data,
the chapter generation means generates a chapter for the meeting based on the meeting data,
the analysis data generation means generates analysis data for the meeting for each chapter, and
the message control means selects the message for each chapter.

(Supplementary Note 10)

The analysis apparatus according to any one of Supplementary Notes 1 to 9, wherein
the emotion data acquisition means acquires the emotion data in which a plurality of indices indicating an emotional state are indicated by numerical values, and
the analysis data generation means generates the analysis data by calculating a statistical value of the emotion data in a predetermined period.

(Supplementary Note 11)

An analysis system including:
the analysis apparatus according to any one of Supplementary Notes 1 to 10; and
an emotion data generation apparatus configured to generate emotion data of the participant and provide the emotion data to the analysis apparatus.

(Supplementary Note 12)

An analysis method executed by a computer, the method including:
acquiring emotion data that involves time data from an emotion data generation apparatus that generates the emotion data from face image data of a meeting participant in an online meeting;
generating analysis data for the meeting based on the emotion data;
acquiring meeting data including attribute data of the meeting;
storing message data in which a pattern of a message to be presented to a user is associated with the meeting data;
selecting the message based on the analysis data and the message data; and
storing an analysis result including the selected message in an outputtable manner.

(Supplementary Note 13)

A non-transitory computer readable medium storing an analysis program for causing a computer to execute:
a process of acquiring emotion data that involves time data from an emotion data generation apparatus that generates the emotion data from face image data of a meeting participant in an online meeting;
a process of generating analysis data for the meeting based on the emotion data;
a process of acquiring meeting data including attribute data of the meeting;
a process of storing message data in which a pattern of a message to be presented to a user is associated with the meeting data;
a process of selecting the message based on the analysis data and the message data; and
a process of storing an analysis result including the selected message in an outputtable manner.

REFERENCE SIGNS LIST

10 ANALYSIS SYSTEM
90 MEETING TERMINAL GROUP
100 ANALYSIS APPARATUS
111 EMOTION DATA ACQUISITION UNIT
112 MEETING DATA ACQUISITION UNIT
113 ANALYSIS DATA GENERATION UNIT
114 MESSAGE CONTROL UNIT
115 OUTPUT UNIT
116 PERSON IDENTIFICATION UNIT
117 CHAPTER GENERATION UNIT
120 STORAGE UNIT
121 MESSAGE DATA
122 ANALYSIS RESULT STORAGE AREA
123 PERSON ATTRIBUTE DATA
124 ANALYSIS HISTORY DATA
200 ANALYSIS APPARATUS
300 EMOTION DATA GENERATION APPARATUS
311 PARTICIPANT DATA ACQUISITION UNIT
312 EMOTION DATA GENERATION UNIT
313 EMOTION DATA OUTPUT UNIT
400 MEETING MANAGEMENT APPARATUS
990 USER TERMINAL
N NETWORK

What is claimed is:

1. An analysis apparatus comprising:
at least one memory storing instructions, and
at least one processor configured to execute the instructions to;
acquire emotion data from an emotion data generation apparatus that generates the emotion data from face image data of a meeting participant in an online meeting;
generate analysis data for the meeting based on the emotion data;
acquire meeting data including attribute data of the meeting;
store message data in which a pattern of a message to be presented to a user is associated with the meeting data;
select the message based on the analysis data and the message data and storing an analysis result including the selected message in the storage means in an outputtable manner,
acquire the emotion data of a presenter and the emotion data of a non-presenter in the meeting in a distinguishable manner,
acquire the meeting data including data for identifying a presenter in the meeting,
generate the analysis data by distinguishing between the presenter and the non-presenter,
identify a detailed change in the analysis data by calculating an average value of the emotion data at an end of a chapter,
based on the detailed change, cause the storage means to store the analysis result including a message for the presenter in the outputtable manner based on a result of the distinction, and
output the analysis result.

2. The analysis apparatus according to claim 1, wherein the at least one processor is further configured to execute the instructions to:
select a method of calculating the analysis data based on the attribute data and generates the analysis data.

3. The analysis apparatus according to claim 1, wherein the at least one processor is further configured to execute the instructions to:
generate a plurality of preset analysis items,
store message data set based on the plurality of analysis items, and
select a message based on the analysis item for the meeting.

4. The analysis apparatus according to claim 1, wherein the at least one processor is further configured to execute the instructions to:
store analysis history data regarding the analysis result generated in the past, and
generate the analysis data including a relative comparison result of the meeting corresponding to the attribute data based on the attribute data and the analysis history data.

5. The analysis apparatus according to claim 1, wherein the at least one processor is further configured to execute the instructions to:
identify a person based on face image data,
acquire face image data of the participant,
identify a segmentation to which the participant belongs from the face image data, and
generate the analysis data in consideration of the segmentation.

6. The analysis apparatus according to claim 1, wherein the at least one processor is further configured to execute the instructions to:
identify a person based on face image data,
acquire face image data of the participant,
identify the participant from the face image data, and
generate the analysis data of the participant related to the identification.

7. The analysis apparatus according to claim 1, wherein the at least one processor is further configured to execute the instructions to:
select, as the message, advice for the analysis data to fall within a range of a preset threshold value in a case where the analysis data exceeds the range of the threshold value.

8. An analysis method executed by a computer, the method comprising:
acquiring emotion data that involves time data from an emotion data generation apparatus that generates the emotion data from face image data of a meeting participant in an online meeting;
generating analysis data for the meeting based on the emotion data;
acquiring meeting data including attribute data of the meeting;
storing message data in which a pattern of a message to be presented to a user is associated with the meeting data;
selecting the message based on the analysis data and the message data; and
storing an analysis result including the selected message in an outputtable manner,
acquiring the emotion data of a presenter and the emotion data of a non-presenter in the meeting in a distinguishable manner,
acquiring the meeting data including data for identifying a presenter in the meeting,
generating the analysis data by distinguishing between the presenter and the non-presenter, and
identifying a detailed change in the analysis data by calculating an average value of the emotion data at an end of a chapter,
based on the detailed change, causing the storage means to store the analysis result including a message for the presenter in the outputtable manner based on a result of the distinction, and
outputting the analysis result.

9. The analysis method according to claim 8, the computer further performs the following processing of:
selecting a method of calculating the analysis data based on the attribute data and generating the analysis data.

10. The analysis method according to claim 8, the computer further performs the following processing of:
generating a plurality of preset analysis items,
storing message data set based on the plurality of analysis items, and
selecting a message based on the analysis item for the meeting.

11. The analysis method according to claim 8, the computer further performs the following processing of:
storing analysis history data regarding the analysis result generated in the past, and
generating the analysis data including a relative comparison result of the meeting corresponding to the attribute data based on the attribute data and the analysis history data.

12. The analysis method according to claim 8, the computer further performs the following processing of:
acquiring the emotion data of a presenter and the emotion data of a non-presenter in the meeting in a distinguishable manner,
acquiring the meeting data including data for identifying a presenter in the meeting,
generating the analysis data by distinguishing between the presenter and the non-presenter, and
causing the storage means to store the analysis result including a message for the presenter in an outputtable manner based on a result of the distinction.

13. The analysis method according to claim 8, the computer further performs the following processing of:
identifying a person based on face image data,
acquiring face image data of the participant,
identifying a segmentation to which the participant belongs from the face image data, and
generating the analysis data in consideration of the segmentation.

14. A non-transitory computer readable medium storing an analysis program for causing a computer to execute:
a process of acquiring emotion data that involves time data from an emotion data generation apparatus that generates the emotion data from face image data of a meeting participant in an online meeting;
a process of generating analysis data for the meeting based on the emotion data;
a process of acquiring meeting data including attribute data of the meeting;
a process of storing message data in which a pattern of a message to be presented to a user is associated with the meeting data;
a process of selecting the message based on the analysis data and the message data; and a process of storing an analysis result including the selected message in an outputtable manner, a process of acquiring the emotion data of a presenter and the emotion data of a non-presenter in the meeting in a distinguishable manner, a process of acquiring the meeting data including data for identifying a presenter in the meeting, a process of generating the analysis data by distinguishing between the presenter and the non-presenter, and a process of identifying a detailed change in the analysis data by calculating an average value of the emotion data at an end of a chapter, a process of, based on the detailed change, causing the storage means to store the analysis result including a message for the presenter in the outputtable manner based on a result of the distinction, and a process of outputting the analysis result.

15. The non-transitory computer readable medium storing an analysis program according to claim 14, wherein the program for causing the computer to execute the further processing of:

selecting a method of calculating the analysis data based on the attribute data and generating the analysis data.

16. The non-transitory computer readable medium storing an analysis program according to claim 14, wherein the program for causing the computer to execute the further processing of:

generating a plurality of preset analysis items, storing message data set based on the plurality of analysis items, and selecting a message based on the analysis item for the meeting.

17. The non-transitory computer readable medium storing an analysis program according to claim 14, wherein the program for causing the computer to execute the further processing of:

storing analysis history data regarding the analysis result generated in the past, and generating the analysis data including a relative comparison result of the meeting corresponding to the attribute data based on the attribute data and the analysis history data.

18. The non-transitory computer readable medium storing an analysis program according to claim 14, wherein the program for causing the computer to execute the further processing of:

acquiring the emotion data of a presenter and the emotion data of a non-presenter in the meeting in a distinguishable manner, acquiring the meeting data including data for identifying a presenter in the meeting, generating the analysis data by distinguishing between the presenter and the non-presenter, and causing the storage means to store the analysis result including a message for the presenter in an outputtable manner based on a result of the distinction.

19. The non-transitory computer readable medium storing an analysis program according to claim 14, wherein the program for causing the computer to execute the further processing of:

identifying a person based on face image data, acquiring face image data of the participant, identifying a segmentation to which the participant belongs from the face image data, and generating the analysis data in consideration of the segmentation.

* * * * *